United States Patent [19]

Toussaint et al.

[11] Patent Number: 4,751,203

[45] Date of Patent: Jun. 14, 1988

[54] MANUFACTURING VITREOUS BEADS

[75] Inventors: Francois Toussaint, Montignies-le-Tilleul; Pierre Goelff, Nalinnes, both of Belgium

[73] Assignee: Glaverbel, Brussels, Belgium

[21] Appl. No.: 876,805

[22] Filed: Jun. 20, 1986

[30] Foreign Application Priority Data

Jun. 21, 1985 [GB] United Kingdom ................ 8515744

[51] Int. Cl.$^4$ ............................................. C03C 12/00
[52] U.S. Cl. ...................... 501/33; 428/406; 501/12
[58] Field of Search .............................. 501/33, 29, 34; 428/404, 406; 521/57

[56] References Cited

U.S. PATENT DOCUMENTS

| | | | |
|---|---|---|---|
| 3,030,215 | 4/1962 | Veatch | 428/406 |
| 3,242,032 | 3/1966 | Schott | 501/33 |
| 3,838,998 | 10/1974 | Matthews et al. | 501/33 |
| 4,002,482 | 1/1977 | Coenen | 501/33 |
| 4,063,916 | 12/1977 | Devos et al. | 501/33 |
| 4,113,915 | 9/1978 | Schott | 501/33 |
| 4,133,854 | 1/1979 | Hendricks | 501/33 |
| 4,336,338 | 6/1982 | Downs | 501/12 |
| 4,340,642 | 7/1982 | Netting et al. | 428/406 |
| 4,367,919 | 1/1983 | Tung et al. | 501/34 |
| 4,391,646 | 7/1983 | Howell | 501/33 |
| 4,448,599 | 5/1984 | Mackenzie et al. | 501/33 |
| 4,472,185 | 9/1984 | Wu | 501/33 |
| 4,564,556 | 1/1986 | Lange | 501/33 |
| 4,640,905 | 2/1987 | Burn | 501/136 |

FOREIGN PATENT DOCUMENTS

| | | | |
|---|---|---|---|
| 2463108 | 3/1981 | France | 501/33 |
| 1011596 | 12/1965 | United Kingdom | 501/29 |
| 2151610 | 7/1985 | United Kingdom | 501/33 |

OTHER PUBLICATIONS

*The Technology of Glass & Ceramics,* Jan Hlavaé, Elsevrei Scientific Publishing Co., Amsterdam, p. 291.
*The Technology of Glass and Ceramics,* Jan Hlavae, Elesevier Co. NY (1980), pp. 230-237, 290.
*Glass-Ceramics and Phop-Shalls,* A. Berezinoi, Plenom Press, NY (1970), pp. 75-76, 192-201.
*Fabrication of the Glass Microballoon Laser Target,* Severs, et al. Lawrence Livermore Laboratory UCRL-51609 (1974), pp. 1-6, 47-50.

Primary Examiner—William R. Dixon, Jr.
Assistant Examiner—Andrew B. Griffis
Attorney, Agent, or Firm—Spencer & Frank

[57] ABSTRACT

A process of manufacturing vitreous beads is disclosed in which feedstock particles of a glass-former composition containing less than 15% by dry weight of sodium and potassium calculated as their respective oxides and containing chemically bound water, are fed through a heating zone in which the particles are vitrified and spherulized and the resulting vitreous beads are cooled. The vitrifiable oxide forming elements of said glass-former composition may be chemically interlinked, and the feedstock may be prepared as a silica-based gel or precipitate having a composition suitable for vitrification into a glass of a desired composition which by virtue of its low alkali content is resistant to hydrolytic attack. By control of the cellulating agent content (bound water and optionally a gas evolving salt radical such as nitrate or sulphate) of the feedstock, and its granulometry, the relative proportions of solid and hollow beads which will be produced in a given spherulizing run can be controlled.

22 Claims, No Drawings

MANUFACTURING VITREOUS BEADS

BACKGROUND OF THE INVENTION

This invention relates to a process of manufacturing vitreous beads in which particles of a vitrifiable material are vitrified and spherulized. The invention also relates to vitrifiable particles suitable for use in such a process.

Vitreous beads fall broadly into two main categories, namely solid beads and hollow beads. Beads in both categories find wide use as fillers for plastics materials for various purposes. Hollow beads are also used as fillers for certain explosives, especially those based on an aqueous emulsion, in order to increase their brisance, and deuterium filled hollow beads also find use as laser fusion targets. Solid beads are also incorporated in paint for the manufacture of reflective signs, for example road signs, and for shot- or sand-blasting.

It is well known to manufacture solid glass beads by spherulizing crushed glass cullet, for example originating from waste offcuts from a flat glass manufacturing plant.

In contrast to that simple process which is useful for forming solid glass beads, hollow beads are usually formed from a feedstock comprising pellets of a glass-former composition based on sodium silicate which may have been reacted with some other ingredient such as boric acid. These particles are vitrified and spherulized in a spherulizing furnace. The glass-former composition contains a substance which gives rise to the evolution of gas in such furnace with consequent cellulating effect.

The production of hollow vitreous beads for use as laser fusion targets, starting from a fragmented silica or silica-based gel, is referred to in "Processing of Gel Glasses" by Jerzy Zarzycki in "Glass Science and Technology" (Ed. D. P. Uhlmann & N. J. Kreidl, The Academic Press Inc. 1984) Volume 2, pages 213 to 245. The gel contains occluded water which evaporates when the particles are heated to bring about their vitrification and spherulization, so generating vapour pressure which has an expanding and cellulating effect on the glass beads.

The aforesaid prior processes for producing glass beads by vitrifying and spherulizing particles of a glass-former composition result in hollow vitreous beads having a rather high sodium ion content. As is well known in the glass manufacturing art, sodium compounds act as melting fluxes and promote low melting and vitrification temperatures so facilitating the manufacture of the glass. However the high alkali metal ion content renders the beads liable to attack by hydrolysis. The result of this is that initial adherence between the beads and any plastics materials in which they are used as filler is rapidly weakened and the ageing properties of a plastics or an explosive in which the beads are used as filler are consequently poor. In the case of a filled explosive the advantage of increased brisance is soon lost. The hydrolysis can cause perforation of the bead walls so rendering them useless as a filler for an explosive or as a laser fusion target.

In order to promote good ageing properties of various products incorporating hollow vitreous beads, it is known to subject the beads to an acid leaching treatment to reduce their alkali metal ion content, but such a dealkalising treatment adds to the cost and inconvenience of manufacture.

There is need for a more economic process by which vitreous beads with good resistance to hydrolysis can be produced. There is also a demand for glass beads having special properties not associated with the known high alkali beads, for example a high mechanical strength/bulk density ratio to serve as a low density filler capable of resisting the pressures involved in injection moulding or extruding filled plastics materials, or a high refractive index as required for beads to be used in light reflecting devices.

Vitrifiable compositions used in manufacturing low alkali glasses, because they are low in melting fluxes, require relatively high furnace temperatures for melting and vitrification. This is why such compositions have not been used as starting material for the production of hollow glass beads in a vitrifying and spherulizing furnace. Prima facie, an increased furnace temperature should be avoided because of the necessity for gas retention where it can exert its cellulating effect. For producing hollow beads of low alkali glass, the procedure has been to crush pre-formed glass of the required special composition and then to subject the resulting particles to a treatment in which gas is caused to dissolve in the glass of the particles with the aim that on subsequent spherulization of the particles, the gas will expand and cellulate the beads. Such a process is described in U.S. Pat. No. 3,365,315. Of course the production of glass for use as feedstock in such processes requires the use of a glass melting furnace operating to high temperatures at which the refractory material of the furnace is subject to considerable erosion; also the fuel costs for heating the furnace are very high.

SUMMARY OF THE INVENTION

It is an object of the present invention to provide a process by which vitreous beads can be economically and conveniently produced from a glass-former composition to have a higher resistance to hydrolysis than those produced by the prior processes of this kind and which is at the same time applicable for producing both solid and hollow beads.

According to the present invention there is provided a process of manufacturing vitreous beads in which particles of a glass-former composition containing less than 15% by dry weight of sodium and potassium calculated as their respective oxides an containing chemically bound water, are fed through a heating zone in which the particles are vitrified and spherulized and the resulting vitreous beads are cooled.

The adoption of such a process results in the manufacture of vitreous beads which, by virtue of their low content of sodium and potassium oxides are resistant to hydrolytic attack. As will hereafter be exemplified, the glass-former composition can have any of a number of different formulations selected so that the formed beads have special properties which may be required for different purposes, such as a high crush resistance.

DESCRIPTION OF THE PREFERRED EMBODIMENTS

Surprisingly, notwithstanding the fact that the glass-former composition is low in glass-melting fluxes, this process is easily capable of being performed so that a high proportion of the formed glass beads are hollow. It has been found that using given spherulizing furnace conditions the bead production rate can be appreciably higher than in the case that the feedstock is pre-vitrified glass of the same composition as that of the beads formed by the new process. An additional factor which may contribute to the surprising result may be the fact that at least some of the water (potentially a cellulating agent) present in a glass-former composition is in a chemically bound condition when the particles of the composition enter the spherulizing furnace. It is also noteworthy that the particles become vitrified while they are travelling through the heating zone and in consequence refractory material defining that zone will not be exposed to the same eroding conditions as would obtain in a glass-melting furnace.

The term "hollow beads" as used herein denotes beads having a void therein having a relative density less than 1.0, such that these beads float on water whereas the term "solid beads" denotes having no void therein having a relative density equal to or greater than 1.0 so that these beads do not float on water.

The most important factors influencing the bead structure are the volatile, gas evolving, content of the glass-former particles feeding the spherulizing furnace, and the granulometry of such particles.

A high content of volatile substance will in itself encourage a tendency towards cellulation of the beads. The volatile content of a given glass-former composition can to some extent be adjusted by a simple drying step. Also of importance is the temperature at which the gas is evolved by the glass-former composition. For the production of hollow beads, it is desirable that gas should be released while the material forming the beads has a sufficiently low viscosity to flow so that it can expand and entrap that gas. Because the water present in the glass-former composition is chemically bound its release is delayed, and it is therefore available as a cellulating agent notwithstanding that the glass-former composition is low in melting fluxes and therefore the resulting glass has a higher melting point than conventional compositions of bead forming glass. In some preferred embodiments of the invention, the glass-former composition includes at least one gas evolving salt. Especially preferred examples of such salts are nitrates and sulphates. Such salts tend not to release gas until heated to even higher temperatures than are required for the release of chemically bound water, and their use is particularly recommended for the formation of hollow beads of especially low densities and/or where it is desired to manufacture hollow beads of a glass composition which has a high melting point, for example beads of an alumino-silicate, boro-silicate or alumino-boro-silicate glass.

The glass-former composition preferably includes less than 5% by weight, for example about 1% by weight of such gas evolving salt, calculated as the weight of the respective salt radical.

However the granulometry also plays a very important role. It has surprisingly been found that various glass-former compositions which convert to hollow beads when particles of such compositions are subjected to given spherulizing conditions will, despite the evolution of gas from within the particles, convert to solid beads under the same spherulizing conditions if the glass-former composition is fed to the spherulizing furnace in the form of smaller particles. How small the particles should be for that purpose, when using a given glass-former composition, depends on the temperature/time curve of the heat treatment in the spherulizing furnace. The appropriate maximum particle size can easily be determined by tests.

The fact that one and the same spherulizing furnace can be employed under the same operating conditions for producing both hollow and solid beads has important consequences for the convenience and economy of glass bead production in factories which are or will be involved in the production of both kinds of beads. It is even possible to produce hollow and solid beads simultaneously in the same furnace by using a feedstock comprising fractions of particles in different size categories.

In some especially preferred embodiments of the invention, the temperature and time of heating in the heating zone (spherulizing furnace) are so related to the size range of the particles and the proportion of gas which is evolved by such heating that at least 20%, and in some preferred embodiments, at least 30% by weight of the formed beads have a relative density equal to or greater than 1.0.

A particular advantage in forming solid beads by a process according to the invention is that in a given spherulizing furnace, for a given fuel feed rate and for a given bead composition, the production yield of beads can be 50 to 100% higher than when crushed glass cullet is used.

The discovery that particles of a glass-former composition, which contains chemically bound water, can be converted in a spherulizing furnace to solid beads provided the granulometry of the particles is appropriately related to the furnace temperature and the residence time of the particles in the furnace also has important potential consequences for the production of beads of other glass compositions because the phenomenon is not dependent on the alkali content of the glass composition.

Examples of such processes are described in a co-pending application filed herewith which also claims priority from British Patent Application No. 85 15 744 and which claims a process of manufacturing vitreous beads in which particles of a glass-former composition containing chemically bound water, are fed through a heating zone in which the particles are vitrified and spherulized and the resulting vitreous beads are cooled, characterised in that the size range of said particles and their content of substance which becomes gaseous during the passage of the particles through said heating zone are such that at least 20% by weight of the formed beads have a relative density greater than 1.0.

In the most preferred embodiment of this invention, the glass-former particles used as feedstock contain less than 10% by weight sodium and potassium calculated as the total of their respective oxides. This is found further to promote resistance to hydrolysis in the beads produced. It is also advantageous for said feedstock to be substantially insoluble in water.

Advantageously, the vitrifiable oxide forming elements of said glass-former composition are chemically interlinked in said composition. The presence of such chemical bonding between those elements tends to promote rapid vitrification of the beads in the spherulizing furnace so giving greater fuel economy and a higher production yield. In some preferred embodiments of the invention, said composition is prepared as a silica-based gel, but in the most preferred embodiments of the invention, it is prepared as a silica-based precipitate.

Particular importance is attached to the use of the invention for producing vitreous beads having special properties, for example a relatively high mechanical strength/relative density ratio which is desirable in the case of beads to be used as a filler in plastics materials for injection moulding or extrusion. Hitherto hollow vitreous beads for use as such a filler have been formed with relatively thick walls to give them adequate crushing resistance. By using the present invention, lower relative density beads of the same strength can be produced by selecting an appropriate special glass-former composition.

Vitreous beads having other special properties can also be formed by processes according to the invention because the selection of useful glass-former composition is no longer restricted to those which form ordinary soda-lime glass.

Preferably the glass-former composition is composed so that said particles vitrify to form a special glass such as an alumino-silicate, boro-silicate or alumino-boro-silicate glass. Such glasses have special properties which are of practical importance for various purposes. In addition to their good resistance to hydrolysis, alumino-silicate glasses in particular have high hardness; and alumino-boro-silicate glasses usually have a high Young's modulus.

The adoption of this invention gives special advantages in fuel economy when used for the production of low alkali alumino-silicate, boro-silicate or alumino-boro-silicate glass beads since batch materials used for forming those glasses have usually to be heated to at least 1600° C. in a glass-melting furnace in order to form an amorphous glass for the subsequent formation of vitreous beads. By operating in accordance with the invention, such pre-vitrification is obviated, together with consequent fuel and furnace maintenance costs.

In some preferred embodiments of the invention, said glass-former composition includes boron and/or aluminum in an amount of at least 10% and preferably at least 15% calculated as the respective oxide(s) in dried particles. Especially advantageous properties can be conferred on the vitreous beads produced by adopting this feature.

EXAMPLES

By way of example, the following specific compositions and composition ranges of vitreous beads may be mentioned.

| I | |
|---|---|
| $SiO_2$ | 53 to 75% by weight |
| $TiO_2$ | 3 to 7 |
| $Li_2O$ | 3 to 15 |
| $Al_2O_3$ | 12 to 36 |

Due to the presence of titanium, these beads can be treated to form a vitro-ceramic when they have excellent thermal and mechanical properties.

| II | |
|---|---|
| $SiO_2$ | 65% by weight |
| $Al_2O_3$ | 16 |
| CaO | 12.5 |
| MgO | 4.2 |

Such beads are of a glass having high hardness, and this is attributable to their alumina content.

| III | |
|---|---|
| $SiO_2$ | 52 to 56% by weight |
| $B_2O_3$ | 9 to 11 |
| $Al_2O_3$ | 12 to 16 |
| CaO | 16 to 19 |
| MgO | 3 to 6 |

Such beads are of glass having a high Young's modulus, which is attributed to their aluminium and boron content.

Beads of these various compositions can readily be made by incorporating the various oxide forming elements, in the required final relative proportions in a gel or precipitate constituting the glass-former composition which is used in particle form as feedstock for feeding to the spherulizing furnace.

It is well known that most glasses which have good mechanical properties have relatively poor thermal properties, and vice versa, so it has not hitherto been possible to combine good mechanical and thermal properties in vitreous beads of a given composition.

According to certain especially preferred embodiments of the invention the glass-former composition used as feedstock includes ions which serve as devitrification nucleating agents for the formation of vitro-ceramic beads. By selecting a suitable glass-former composition having this characteristic, vitreous beads can be formed which do in fact combine excellent mechanical and thermal properties. Especially suitable ions for serving as devitrification nucleating agents comprise titanium and/or zirconium, and their use is accordingly preferred. When such a feedstock is used, it is appropriate to subject the form beads to a devitrifying treatment to convert them into vitro-ceramic beads.

Glass-former compositions for use in carrying out this invention can be prepared quite easily. For example one way of preparing an alumino-silicate gel glass-former is to mix together tetramethyl orthosilicate and aluminium isopropoxide in solution in alcohol. A soda-lime glass-former precipitate can be prepared by mixing solutions of sodium silicate and $Ca(NO_3)_2$ in acid medium, washing the precipitate and then treating it in NaOH. A boro-silicate glass-former precipitate can be prepared by adding boric acid to a solution of $Ca(NO_3)_2$ in methanol, and mixing the resulting solution with a solution of sodium silicate. The gel or precipitate as the case may be, after being washed if necessary and dried, can easily be reduced to the required particle size for use as the feedstock.

The vitrification and spherulizing of the glass-former particles can be carried out in a manner well known per se in the art of vitreous bead manufacture. For example the particles can be carried by a gas stream into a furnace in which the particles are entrained in a rising current of burning gas, and then carried through a cooling zone in which the particles which have become vitrified and spherulized in the furnace are sufficiently cooled to prevent mutual adherence when collected.

Particles suitable for use as feedstock in a process according to this invention are novel per se and the present invention includes particles of a glass-former composition which can be converted to vitreous beads by vitrifying and spherulizing the particles in a spherulizing furnace, the composition of such particles containing chemically bound water and less than 15% by dry weight sodium and potassium calculated as the total of their respective oxides.

Such particles can be easily manufactured.

In some preferred embodiments of the invention which are especially useful for the manufacture of hollow beads, the feedstock glass-former composition includes at least one gas evolving salt, preferably a nitrate and/or a sulphate.

Preferably the composition of said particles contains less than 10% by weight sodium and potassium calculated as the total of their respective oxides. This is found further to promote resistance to hydrolysis of beads produced from such particles. It is also advantageous for said particles to be substantially insoluble in water.

Advantageously, the oxide forming elements for forming the vitreous material are chemically interlinked in said glass-former composition. The presence of such chemical bonding between those elements tends to promote rapid vitrification of the particles in a spherulizing furnace, so giving greater fuel economy and a higher production yield. In some preferred embodiments of the invention, the glass-former composition is prepared as a silica-based gel, but in the most preferred embodiments of the invention, it is prepared as a silica-based precipitate.

Preferably at least a fraction of said particles of glass-former composition are in the size range 20 $\mu$m to 250 $\mu$m. And preferably said particles include a fraction below in the lower part of said size range. Particles of such small sizes can be readily converted to solid beads by a heat treatment which in respect of time and temperature conditions is also suitable for forming hollow glass beads from particles of the same composition but of larger size.

In certain very advantageous embodiments of the invention the particles of glass-former composition have a wide size range such that significant proportions of both hollow and solid beads can be formed therefrom. For producing hollow as well as solid beads the particles preferably include a fraction of sizes above 20 $\mu$m.

The invention includes particles as above defined wherein the composition of the particles includes ions which can serve as devitrification nucleating agents for the formation of vitro-ceramic beads. The existence of this characteristic in a suitably selected glass-former composition affords the advantage that the particles can be converted in a spherulizing furnace to beads combining excellent mechanical and thermal properties. Especially suitable ions for serving as devitrification nucleating agents comprise titanium and/or zirconium and/or fluorine and their use is accordingly preferred. When such a feedstock is used, it is appropriate to subject the formed beads to a devitrifying treatment to convert them into vitro-ceramic beads.

In some preferred embodiments of the invention, the particles are of a composition which includes boron and/or aluminium in an amount of at least 10% and preferably at least 15% calculated as the respective oxide in dried particles. Vitreous beads have especially advantageous properties can be produced by vitrifying and spherulizing such particles.

In some preferred embodiments of the invention, said glass-former particles are composed so that they are vitrifiable to form a special glass, such as an aluminosilicate, boro-silicate or alumino-borosilicate glass, having the particularly advantageous properties hereinbefore referred to.

The invention includes any process of manufacturing vitreous beads which is as herein defined and wherein the particles of glass-former composition used in the process are particles having any one or more of the properties or characteristics above referred to in relation to particles of glass-former composition per se.

The invention includes vitreous beads produced by a process according to the invention as herein defined.

Preferred embodiments of the present invention will now be described by way of Example.

EXAMPLE 1

It is desired to manufacture vitreous beads of the following composition by weight

| | |
|---|---|
| $SiO_2$ | 51% |
| $B_2O_3$ | 11 |
| $Al_2O_3$ | 14 |
| CaO | 16 |
| MgO | 4 |
| $Na_2O$ | 4 |

A glass of this composition has a high Young's modulus of elasticity, above 7500 kg/mm$^2$.

Two starting liquids are made up. The first is made by mixing in the liquid phase tetraethoxysilane [Si(OC$_2$H$_5$)$_4$] (which may be prehydrolised), aluminum butylate [Al(OC$_4$H$_9$)$_3$] and boron butylate [B(OC$_4$H$_9$)$_3$], and the second is a solution in methanol of methylates of magnesium [Mg(OCH$_3$)$_2$], calcium [Ca(OCH$_3$)$_2$] and sodium [NaOCH$_3$]. The alcoholates are used in molar proportions corresponding to the proportions of the oxide forming elements in the glass composition. These alcoholates are hydrolysed in the addition of water in a molar proportion of [H$_2$O]:[alcoholates]=3:1 in the presence of acetic acid. By hydrolysis and polycondensation of the mixture of the starting liquids, a gel is formed. After heating between 80° and 250° C. to reduce the volatile content in the gel to about 5% by weight, such volatile content being mostly water and alcohol, a powdery gel is obtained.

This powder, whose grains have a mean size of about 9 $\mu$m is injected into flame of a burner to effect vitrification and spherulization at a rate of 500 kg/hour. The burner is fed with fuel (natural gas) at a rate of 130 Nm$^3$/hour and with air at a rate of 15000 Nm$^3$/hour. The hottest part of the furnace reaches a temperature from 1200° to 1500° C. The resulting beads are cooled and collected using a cyclone equipped with a sleeve filter, and are then passed to a settling tank containing water to effect gravity separation of hollow beads having a relative density less than 1.0 from solid beads having a relative density greater than or equal to 1.0. About 70% by weight of the beads produced were solid with a mean diameter of less than 9 $\mu$m, the remainder being hollow with a mean diameter of about 20 $\mu$m.

These beads are useful as filler for plastics materials.

EXAMPLE 2

Example 1 is repeated with the modification that the gel powder is dried to reduce the volatile content to below 1% by weight. This drying is effected in a fluidised bed. Substantially all the beads produced have a relative density greater than 1.0.

EXAMPLE 3

It is desired to manufacture vitreous beads of the following composition by weight

| | |
|---|---|
| $SiO_2$ | 60% |

-continued

|       |    |
|-------|----|
| $B_2O_3$ | 9  |
| $Al_2O_3$ | 11 |
| CaO   | 16 |
| MgO   | 4  |

A glass of this composition has a very high Young's modulus of elasticity, and a very high resistance to hydrolytic attack.

As in Example 1, starting liquids are prepared using alcoholates of the elements which will form the oxides in the vitreous material, in this case silicon, boron, aluminium, calcium and magnesium. In this Example, however, hydrolysis takes place with the addition of water in a molar proportion of $[H_2O]:[alcoholates]=6:1$, in the absence of acetic acid. On completion of the reactions, there results a gel having a viscosity such that it can be spray dried, and this is done at 250° C. in order to obtain particles having a mean diameter of 25 μm and a volatile content of about 5% by weight, this being substantially all bound water.

The resulting feedstock is sprayed in a flame as in Exammple 1, to result in the formation of substantially equal weights of hollow and solid vitreous beads. The solid beads have a mean diameter of less than 25 μm, and the hollow beads a mean diameter of about 40 μm.

In a variant of this Example, the gel is flash dried to form particles having a volatile content of about 12%, the particles again having a mean diameter of less than 25 μm. This modification results in the proportion of hollow beads produced being increased to 80% by weight, again with a mean diameter of about 40 μm. The hollow and solid beads can be used as a filler for plastics, and also for explosives.

EXAMPLE 4

It is desired to manufacture vitro-ceramic beads of the following coposition by weight

|        |     |
|--------|-----|
| $SiO_2$ | 65% |
| $Al_2O_3$ | 18  |
| $TiO_2$ | 5   |
| $Li_2O$ | 10  |
| $Na_2O$ | 2   |

Three starting solutions are prepared, the first being a colloidal solution of silica (mean particle diameter about 15 nm), the second being a colloidal solution of Ti-(OH$_4$), and the third being an aqueous solution of $LiNO_3$, $AL(NO_3)_3$ and $NaNO_3$ acidified with nitric acid and containing methanol. The first and second solutions are mixed and then the third solution is added, all at ambient temperature.

As a result a gel is formed, and this is dried at a temperature between 100° C. and 250° C. After grinding a powder is obtained having a residual volatile content comprising water and nitrate. Such feedstock powder having a mean diameter of about 15 μm and 7% residual volatile content is sprayed in the flame of a burner (maximum flame temperature about 1400° C. in a manner similar to that of Example 1.

The feedstock is thereby converted into a mixture of glass beads containing 60% by weight solid beads of less than 15 μm mean diameter and 40% hollow beads having a mean diameter of 30 μm. The solid and hollow beads are again separated using a settling tank containing water.

The two types of glass beads (hollow and solid) thus produced are then subjected to a two-stage heat treatment to induce a crystalline phase in the glass. This treatment comprises a nucleation stage performed at a temperature between 650° C. and 850° C., and a phase separation stage at a temperature from 800° C. to 1000° C. This may be but is not necessarily a continuous treatment, and it is suitably carried out in a fluidised bed.

The resulting vitro-ceramic beads have an extremely high resistance to compression.

The solid beads thus produced are useful for finishing metal surfaces by so-called sand-blasting techniques. It is found that the proportion of such beads which can be recycled for repeated use is considerably higher than is the case with soda-lime glass beads which are usually used for this type of work.

The hollow beads thus produced have, for a wall thickness of 1 to 2 μm, a density of 0.20 to 0.25 kg/L and a resistance to compression which is 2 to 5 times higher than that of similar dimensioned beads of an ordinary boro-silicate glass. In comparative tests of such beads, in which they are subjected to pressures of 50 to 150 bar, as for example they may be during injection moulding or extrusion of filled plastics material, some 10 to 15% of the glass beads break, whereas less than 5% of the hollow vitro-ceramic beads produced in the accordance with this Example break when subjected to the same pressures.

EXAMPLE 5

It is desired to manufacture vitro-crystalline beads of the following composition by weight

|        |       |
|--------|-------|
| $SiO_2$ | 53.5% |
| $Al_2O_3$ | 19.6  |
| CaO    | 8.8   |
| MgO    | 6.3   |
| $Li_2O$ | 5.7   |
| $P_2O_5$ | 6.1   |

Four starting solutions are prepared, the first being an aqueous solution of sodium trisilicate, the second being an aqueous solution of sodium orthophosphate, the third an aqueous solution of nitrates of lithium and aluminium containing nitric acid so as to reduce its pH to below 2, and the fourth a solution of nitrates of calcium and magnesium also with a pH below 2, and containing methanol.

The two nitrate containing solutions are mixed together and the first two solutions are added, all at a temperature of 50° C. with agitation in such manner that the mixture contains the silicon, aluminium, calcium, magnesium, lithium and phosphorus in molar proportions corresponding with the composition given above. This results in the formation of a gel which is dried at a temperature below 100° C. and is then washed to eliminate the sodium. After a second drying step in which the volatile content, bound water and nitrate residue, of the product is reduced to about 5% by weight, there results a powder from which can be selected a fraction having a mean grain size of 15 μm.

This fraction of the powder is passed to a spherulizing burner as described in Example 4 to produce hollow glass beads having a mean diameter of 30 μm and a substantially equal weight of solid glass beads having a mean diameter of less than 15 μm.

The beads are then subjected to a heat treatment at a temperature of 785° C. to produce a superficial crystalline phase of β-quartz. Solid and hollow vitro-crystalline beads produced in this way have a very high mechanical resistance and also a very high resistance to hydrolytic attack. Tests made on a slab of vitro-crystalline material of the same composition show it to have a resistance of flexure which may be as high as 70 kg/mm². These beads are very useful as fillers for plastics materials which are to be subjected to high moulding or extrusion pressures.

EXAMPLE 6

It is desired to manufacture vitro-crystalline beads of the following composition by weight

| | |
|---|---|
| $SiO_2$ | 60% |
| $Al_2O_3$ | 25 |
| $Li_2O$ | 10 |
| $Na_2O$ | 5 |

Two starting solutions are prepared, the first being an aqueous solution of sodium trisilicate, and the second an acidic aqueous solution of nitrates of lithium and aluminium and containing methanol.

The two solutions are mixed together in such manner as to form a precipitate which is then filtered and washed so that it contains the silicon, aluminum, lithium and sodium in proportions corresponding with the composition given above. The precipitate is then dried to a residual volatile content, bound water and nitrate, of 10% by weight.

Particles having a mean grain size of 15 μm are selected and introduced into the flame of a burner having a temperature of 1400° C. as described in Example 4 to produce 60% by weight solid glass beads having a mean diameter of less than 15 μm and 40% by weight hollow glass beads having a mean diameter of about 20 μm.

The solid and hollow beads are subjected to a surface devitrification treatment at 700° C. to form a surface phase of β-eucryptite and β-spodumene. Solid and hollow vitro-crystalline beads produced in this way have a high mechanical resistance. Tests made on a slab of vitro-crystalline material of the same composition show it to have a resistance to flexure of at least 20 kg/mm². These beads are very useful as fillers for plastics materials which are to be subjected to high moulding or extrusion pressures.

In a variant of this Example, the feedstock was dried very quickly to leave a residual volatile content of 15% by weight. When this feedstock is subjected to the same spherulizing treatment, it is found that the proportion of hollow beads, again have a mean diameter of about 20 μm is increased to 60% by weight.

EXAMPLE 7

In a modification of Example 6, similar results are obtained if the sodium trisilicate solution is replaced by a solution of lithium silicate which is mixed with a solution of nitrates of aluminium and sodium in order partially to replace the lithium of the silicate by aluminium and sodium. If necessary this precipitation step can be repeated several times, recycling the solutions at each stage.

EXAMPLE 8

It is desired to manufacture vitro-ceramic beads of the following composition by weight

| | |
|---|---|
| $SiO_2$ | 54.7% |
| $Al_2O_3$ | 15.9 |
| CaO | 8.8 |
| MgO | 8.8 |
| $TiO_2$ | 8.8 |
| $Na_2O$ | 2 |
| $Li_2O$ | 1 |

Such beads have a high mechanical resistance coupled with good resistance to hydrolytic attack.

The following are mixed together in liquid phase in molar proportions corresponding to the compositionn given above:
prehydrolysed tetraethoxysilane
aluminium butylate
titanium butylate, and
methylates of calcium, magnesium, sodium and lilthium previously dissolved in methanol.

The alcoholates are hydrolysed by the addition of water in a molar proportion of $[H_2O]:[alcoholates]=3:1$ in the presence of acetic acid. By hydrolysis and polycondensation of the mixture, a gel is formed. A powdery gel is formed after drying this gel at a temperature which is regulated to reduce the volatile content, bound water and alcohol, to about 5% by weight.

The resulting feedstock has a mean grain size of 10 μm and it is introduced into the flame of a burner having a temperature of 1400° C. as described in Example 4 to produce about 70% by weight solid glass beads having a mean diameter below 10 μm and 30% by weight hollow glass beads having a mean diameter of between 15 and 20 μm.

The two types of glass beads (hollow and solid) thus produced are then subjected to a two-stage heat treatment to induce a crystalline phase in the glass. This treatment comprises a nucleation stage performed at a temperature between 750° C. and 950° C., and a phase separation stage at a temperature from 1000° C.. to 1200° C. This may be but is not necessarily a continuous treatment, and it is suitably carried out in a fluidised bed.

The resulting vitro-ceramic beads have an extremely high resistance to compression.

The solid beads thus produced are useful for finishing metal surfaces by so-called sand-blasting techniques.

The hollow beads thus produced are useful as filler for plastics material.

EXAMPLES 9 to 12

It is desired to manufacture vitreous beads of the following compositions by weight

| | Ex. 9 | Ex. 10 | Ex. 11 | Ex. 12 |
|---|---|---|---|---|
| $SiO_2$ | 71.3% | 68.3% | 67.3% | 67.2% |
| $Na_2O$ | 9.2 | 10.5 | 7.8 | 6.3 |
| $B_2O_3$ | 10.9 | 10.5 | 10.5 | 10.3 |
| CaO | 8.6 | 10.7 | 14.4 | 16.2 |

An aqueous solution of sodium silicate containing sodium metaborate is mixed while agitating with an acidic aqueous solution of calcium nitrate containing methanol and with a boric acid solution.

The composition of the sodium silicate and the quantities of the reagents used are in each case chosen to form a precipitate having a molar composition corresponding to the respective bead composition given above. The precipitates are filtered, washed and dried to leave a respective residual volatile content as follows (% by weight)

| Ex. 9 | Ex. 10 | Ex. 11 | Ex. 12 |
|-------|--------|--------|--------|
| 12.7  | 13.9   | 16.1   | 14.7   |

This volatile material is principally water, with a small quantity of residual nitrate.

The precipitated feedstock is crushed if necessary, and two granulometric fractions are selected. Fraction A has a mean grain diameter below 45 μm and fraction B has a mean grain diameter between 45 μm and 90 μm.

The feedstock is subjected to flame action as described in Example 1, to form spherulized vitreous beads.

In each of these Examples, fraction A produced 70% by weight solid beads (relative density greater than 1) with a mean grain diameter of 20 μm, and 30% by weight hollow beads having an actual (not bulk) relative density of between 0.20 and 0.40.

Fraction B of each of these Examples produced 30% by weight solid beads (relative density greater than 1) with a mean grain diameter of 70 μm, and 70% by weight hollow beads having an actual (not bulk) relative density of between 0.30 and 0.60.

All these beads are useful as fillers for plastics materials.

By way of a variant, similar results are obtained if the starting liquid is prepared in two stages, firstly precipitating calcium silicate in an acid medium and then replacing, in a basic medium, part of the calcium by sodium in order to obtain the desired proportions of $SiO_2$, $Na_2O$ and CaO.

In another variant, urea is added to the starting solutions in quantities such that the precipitates formed contain no more than 2% by weight urea. Beads formed from such a variant precipicated feedstock hardly differ from those of respective Examples 9 to 12.

EXAMPLE 13

High refractive index glass beads of the following composition by weight were prepared:

| | |
|---|---|
| $TiO_2$ | 55% |
| PbO | 35 |
| $SiO_2$ | 9 |
| $B_2O_3$ | 1 | the remainder comprising impurities or compatible incidental ingredients.

Four solutions were prepared namely: (1) a colloidal $SiO_2$ solution wherein the $SiO_2$ particles have a mean diameter of 15 nm, (2) a colloidal solution of $Ti(OH)_4$, (3) an aqueous solution of $Pb(NO_3)_2$ and (4) a boric acid solution.

The four solutions were mixed together at normal temperature, causing formation of a solid product which was then dried by heating at a temperature between 100° and 250° C., preferably a temperature near to 200° C. The dried material was crushed to a mean particle size of 15 μm. This material contained 7% volatiles ($H_2O$ and nitrate radicals).

These particles were injected into a burner flame having a maximum temperature of 1200° C. to effect vitrification and spherulization. 70% by weight of the resulting beads were solid beads with a mean diameter of less than 15 μm; 30% by weight were hollow beads with a mean diameter of 30 μm. The beads were of good spherical form. The solid and hollow beads were separated using a settling tank containing water.

EXAMPLES 14 and 15

It is desired to manufacture vitreous beads of the following compositions by weight

| | Ex. 14 | Ex. 15 |
|---|---|---|
| $SiO_2$ | 65.9% | 65.7% |
| $Na_2O$ | 8.4 | 12.0 |
| $B_2O_3$ | 14.6 | 12.2 |
| CaO | 11.1 | 10.0 |

Reagents are prepared as in Examples 9 to 12, the composition of the sodium silicate and the quantities of the reagents used in each case being chosen to form a precipitate having a molar composition corresponding to the respective bead composition given above. The precipitates are filtered, washed and dried to leave a respective residual volatile content as follows (% by weight)

| | Ex. 14 | Ex. 15 |
|---|---|---|
| Water | 2% | 2% |
| Nitrate | 1 | 4 |

The precipitated feedstock is crushed if necessary, and a granulometric fraction having a mean grain diameter of between 45 μm and 90 μm is selected.

The feedstock is subjected to flame action as described in Example 1, to form spherulized vitreous beads.

In Example 14, there was produced 50% by weight solid beads (relative density greater than 1) with a mean grain diameter of about 70 μm, and 50% by weight hollow beads having an actual (not bulk) relative density of between 0.4 and 0.5.

In Example 15, there was produced 30% by weight solid beads (relative density greater than 1) with a mean grain diameter of about 70 μm, and 70% by weight hollow beads having an actual (not bulk) relative density of between 0.4 and 0.5.

All these beads are useful as fillers for plastics materials.

In a variant of these Examples, the nitrate content of the feedstock is replaced by corresponding sulphate. The results afforded are very similar, though the density of the hollow fraction of beads produced is slightly lower.

What is claimed is:

1. In a process for manufacturing vitreous beads, including the steps of:
   feeding a glass-forming composition in particulate form through a heating zone of a spherulizing furnace where the glass-forming composition is heated to a temperature effective to vitrify and spherulize the particles thereof; and
   cooling the resulting vitreous beads, the improvement comprising:
   providing a glass-forming composition in particulate form which has particles falling within a particle size range effective to form both hollow vitreous beads and solid vitreous beads, which is one of a silica-based gel and a silica-based precipitate and which contains chemically bound water, less than 15% by dry weight of sodium and potassium calculated as the total of their respective oxides, and at least one gas-evolving salt selected from the group consisting of nitrates and sulfates.

2. The process of claim 1, wherein the glass-forming composition has a particle size range and a content of at least one substance which becomes gaseous during feeding of the composition through the heating zone effective to obtain at least 20% by weight of the vitreous beads produced having a relative density greater than 1.0.

3. The process of claim 1, wherein the glass-forming composition contains less than 10% by dry weight of sodium and potassium calculated as the total of their respective oxides.

4. The process of claim 1, wherein the glass-forming composition is substantially insoluble in water.

5. The process of claim 1, wherein the glass-forming composition in particulate form has a particle size range which includes particles ranging from 20 μm to 250 μm.

6. The process of claim 1, wherein the glass-forming composition further comprises ions which serve as devitrification nucleating agents and the vitreous beads produced are vitro-ceramic beads.

7. The process of claim 6, wherein the ions which serve as devitrification nucleating agents comprise at least one of titanium ions and zirconium ions.

8. The process of claim 6, including the further step of subjecting the vitreous beads to a treatment to convert them into vitro-ceramic beads.

9. The process of claim 1, wherein the glass-forming composition further comprises at least one of boron and aluminum in an amount of at least 10% dry weight calculated as the respective oxide.

10. The process of claim 1, wherein the glass-forming composition further comprises at least one of boron and aluminum in an amount of at least 15% dry weight calculated as the respective oxide.

11. The process of claim 1, wherein the glass-forming composition further comprises glass-forming components which vitrify to form a special glass selected from the group consisting of an alumino-silicate glass, a boro-silicate glass, and an alumino-boro-silicate glass.

12. A glass-forming composition in particulate form which has particles falling within a particle size range effective to form both hollow vitreous beads and solid vitreous beads, which is one of a silica-based gel and a silica-based precipitate and which is convertible to vitreous beads by heating in a spherulizing furnace at a temperature effective to vitrify and spherulize the glass-forming composition, the composition comprising:
at least one substance containing chemically bound water,
less than 15% by dry weight of sodium and potassium calculated as the total of their respective oxides; and
at least one gas-evolving salt selected from the group consisting of nitrates and sulfates.

13. The composition of claim 12, wherein the composition comprises less than 10% by dry weight of sodium and potassium calculated as the total of their respective oxides.

14. The composition of claim 12, wherein the composition is substantially insoluble in water.

15. The composition of claim 12, wherein the glass-forming composition in particulate form has a particle size range which includes particles ranging from 20 μm to 250 μm.

16. The composition of claim 12, wherein the glass-forming composition further comprises ions which function as devitrification nucleating agents for the formation of vitro-ceramic beads.

17. The composition of claim 16, wherein the ions which function as devitrification nucleating agents comprise at least one of titanium ions and zirconium ions.

18. The composition of claim 12, wherein the glass-forming composition further comprises at least one of boron and aluminum in an amount of at least 10% by dry weight calculated as the respective oxide.

19. The composition of claim 12, wherein the glass-forming composition further comprises at least one of boron and aluminum in an amount of at least 15% by dry weight calculated as the respective oxide.

20. The composition of claim 12, wherein the glass-forming composition further comprises glass-forming components which are vitrifiable to form a special glass selected from the group consisting of an alumino-silicate glass, a boro-silicate glass, and an alumino-boro-silicate glass.

21. The composition of claim 12, wherein the glass-forming composition has a particle size range and a content of at least one substance which becomes gaseous during feeding of the composition through the spherulizing furnace effective to obtain at least 20 percent by weight of the vitreous beads produced having a relative density greater than 1.0.

22. Vitreous beads produced by a process comprising:
providing a glass-forming composition in particulate form which has particles falling within a particle size range effective to form both hollow vitreous beads and solid vitreous beads, which is one of a silica-based gel and a silica-based precipitate and which contains chemically bound water, less than 15% by dry weight of sodium and potassium calculated as the total of their respective oxides, and at least one gas-evolving salt selected from the group consisting of nitrates and sulfates;
feeding the glass-forming composition in particulate form through a heating zone of a spherulizing furnace where the glass-forming composition is heated to a temperature effective to vitrify and spherulize the particles thereof; and
cooling the resulting vitreous beads.

* * * * *